United States Patent [19]

Amato et al.

[11] 4,025,267
[45] May 24, 1977

[54] CONTINUOUS MOLDING MACHINE

[76] Inventors: John Amato, 36 Brookside Drive, Plandome, N.Y. 11030; Charles Hirsch, 200 E. 84 St., New York, N.Y. 10028; Louis Siegel, 22 Mine Road, Monroe, N.Y. 10950

[22] Filed: Nov. 4, 1975

[21] Appl. No.: 628,798

[52] U.S. Cl. .............................. 425/236; 425/261; 425/257; 425/436 R; 214/1 BS
[51] Int. Cl.² .......................................... B29C 7/00
[58] Field of Search .......... 425/236, 233, 317, 257, 425/261, 335, 436 R, 437, 455, 246; 214/1 BS

[56] References Cited

UNITED STATES PATENTS

| 379,068 | 3/1888 | Heller et al. | 425/236 X |
| 1,128,407 | 2/1915 | Carpenter | 425/261 |
| 2,022,895 | 12/1935 | Morrell | 425/233 X |
| 2,549,531 | 4/1951 | Schlicksupp | 425/233 X |
| 2,959,818 | 11/1960 | Diehl et al. | 425/236 |
| 3,915,085 | 10/1975 | Lehmann | 214/1 BS X |

Primary Examiner—Robert L. Spicer, Jr.
Attorney, Agent, or Firm—C. Bruce Hamburg

[57] ABSTRACT

A continuous molding machine particularly adapted for but not limited, in principle, to the making of waffles includes a lower conveyor carrying a plurality of forms each constituting a first part of a respective two-part split mold, a second conveyor carrying a plurality of forms each constituting the other part of the respective split molds and means for guiding the respective conveyors in respective paths so that the first and second mold parts are carried from spaced apart positions to positions in which the parts meet in registry and each of the molds defined by the parts is thereby closed and then the first and second mold parts are carried away from each other again so that each of the molds is opened. The conveyors carrying the mold parts may be passed through an oven to different extents so that the respective conveyors are heated differently and means are provided for aligning the mating mold parts despite different thermal expansions of the conveyors. Means may be provided for facilitating or positively effecting partial opening of the closed molds to permit the release of gases or vapors contained in the molds. Means may be provided for permitting the closed molds to partially open to release gases or vapors contained therein only upon the reaching of a predetermined minimum gas or vapor pressure in the mold. Means may be provided for swinging the mold parts out of the plane of the conveyor on which they are carried in order to facilitate such operations as cleaning of the mold parts.

9 Claims, 6 Drawing Figures

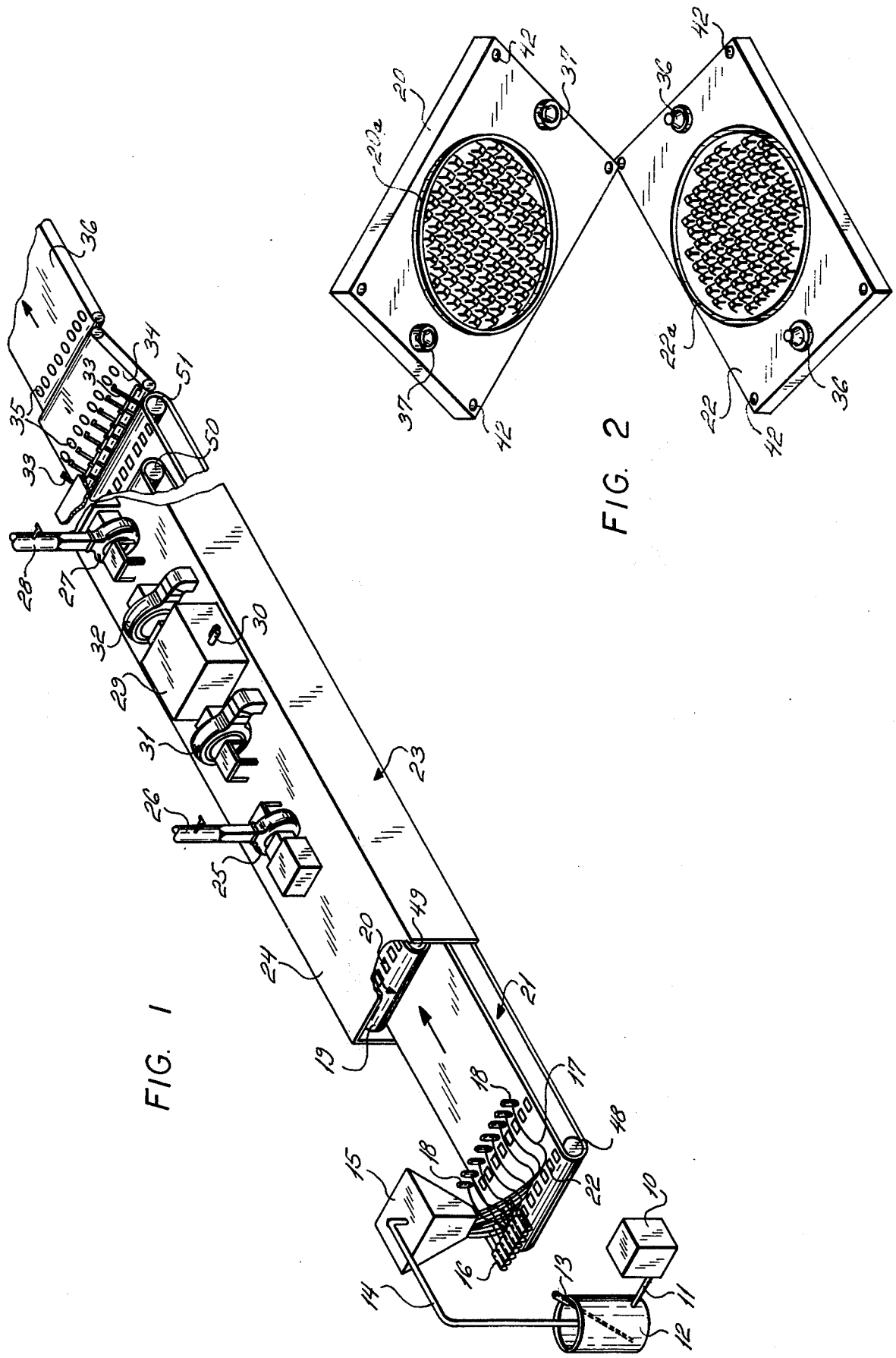

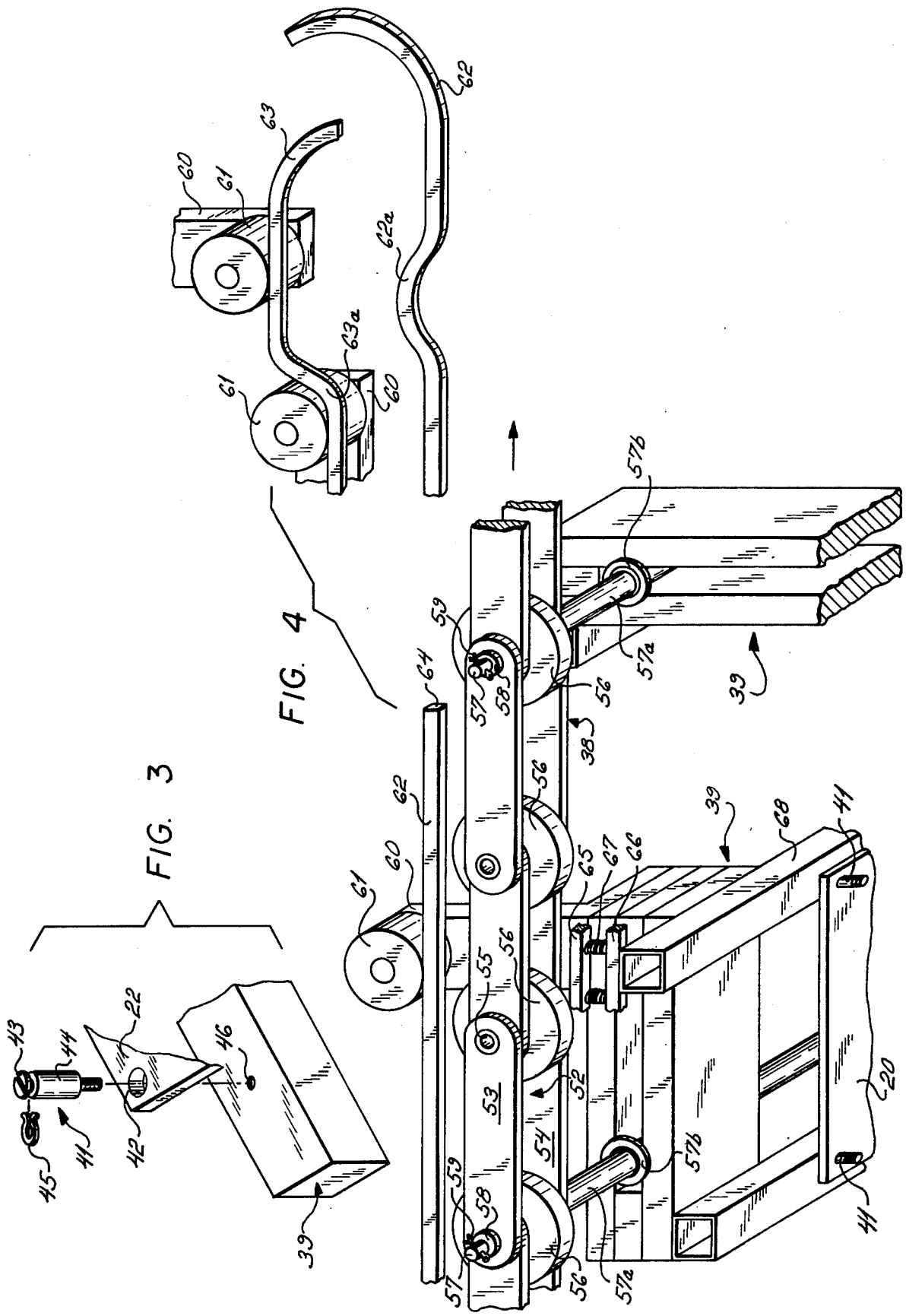

CONTINUOUS MOLDING MACHINE

BRIEF SUMMARY OF THE INVENTION

This invention relates to continuous molding machines.

The invention is described herein in connection with the commerical mass production of frozen waffles. It is apparent, however, that the invention is applicable to continuous molding in general.

Prior art continuous molding machines for the commercial mass production of waffles include a conveyor carrying for each of the waffles a two-part split mold in which the mold parts are hinged together and the desired cycle of closing and opening of the molds is effected by cam means and cam follower means. Typically, an arm is provided on one of the mold parts. The arm carries a roller. Adjacent to the conveyor is provided a track or other means for contacting the roller at least at those portions of the path of travel of a mold along the machine at which it is desired to impart an opening, closing, holding closed or holding open action to the mold. In this case, the roller is the cam follower means and the track or other structure which the roller engages is the cam means.

In the prior art machines of the aforementioned type, since each pair of mold parts is carried by the same conveyor whereby each of the parts of the pair is subjected to the same heating by any oven through which the mold is passed and, moreover, the mold parts of the pair are hinged together, registry of the mold parts upon closing of the mold is not a problem. However, this prior art arrangement has distinct disadvantages. The multiplicity of cam followers adds to the complexity of the machine. Moreover, multiple parallel cams and cam followers can create difficulties insofar as concerns the provision of space for these parts and accessibility to these parts for servicing and maintenance. Consequently, in these prior art machines there are not normally found more than two molds abreast. Another disadvantage of the hinged split mold is that access to the interior molding surfaces of the individual mold parts for the purposes of cleaning the interior or removing a molded article, typically a waffle, which stuck in the mold part rather than being removed at the proper point is limited. Solutions to this problem involve increasing dimensions of the machine, which is also disadvantageous.

It is an object of the present invention to provide a continuous molding machine which in principle is particularly suitable for but not limited to the mass production manufacture of waffles and which does not suffer the aforementioned disadvantages inherent in the prior art. Other objects and advantages of the invention will be apparent from the following description.

In accordance with one aspect of the invention, the opposed parts of the split molds are carried by a pair of conveyors which merge to bring the mold parts together to close the molds and then diverge to open the molds. The cam and cam follower arrangements characteristic of the prior art are thus eliminated. Consequently, multiple, for example, eight, side by side molds may be carried by the conveyors. The result is a machine of greatly increased capacity. Furthermore, access to the interiors of the mold parts for the aforementioned purposes is improved.

However, when the molds are to be conveyed through an oven, which may be for such purpose, for example, as baking or curing the contents of the molds, the respective conveyors may be heated differently. For example, typically the entire upper conveyor is in the oven whereas the lower conveyor extends in front of the entry of the oven for loading of the material into the lower mold parts and extends in back of the exit of the oven for transfer of the baked or cured molded articles out of the lower mold parts. The conveyors are comprised of metallic elements, typically including chains. Different heating of the conveyors consequently results in different thermal expansions thereof. Hence, the mold parts on the respective conveyors will not meet in perfect alignment for proper closing of the molds in the absence of means for compensating for the different thermal expansions. According to another aspect of the invention, such means are provided. In a preferred embodiment, each lateral row of mold parts is mounted on a respective frame. Each mold part of the row is individually mounted on the frame. Alternatively, the mold parts of each lateral row may be distributed over a plurality of frames. For example, a lateral row of eight mold parts may be divided between two like frames, four mold parts being mounted on each frame. The means for mounting each mold part on the frame comprise pins rigidly fastened to the frame and received in respective clearance holes in the mold part. To the interior face of one mold part of each pair are connected male members extending away from the plane of the mold part and tapering toward their distal end. Connected to the interior face of the other mold part of each pair are female members extending away from the plane of the mold part and each provided with a flared cavity which opens at the distal end of the member and with which a respective male member of the aforementioned mold part mates. Similar male and female members are provided on opposed frames of the conveyors and are dimensioned to extend sufficiently far so that they mate before the similar members on the mold parts mate. In operation of the machine, a series of adjustments automatically occurs to result in perfect alignment of the mold parts as the parts meet to close the molds. First, the male and female members on the frames align the frames, the frames being connected to the chains by means providing sufficient play to permit such alignment. When this first stage of alignment is completed, the male and female members on the mold parts align the mold parts, the clearance between the pins fastening the mold parts to the frames and the holes in the mold parts in which the pins are received permitting this second alignment. When this second stage of alignment is completed, a final, even more precise alignment of the mold parts is effected during the final closing of the mold. For this purpose, one of the mold parts of each pair is provided with a lip along the periphery of the mold cavity in that part, the lip projecting away from the mold part at substantially a right angle, and the other mold part of each pair is provided with a recess along the periphery of the mold cavity in that other mold part, the recess being shaped and dimensioned for receiving the lip with a clearance small enough to effect and maintain precise alignment of the closed mold.

According to another aspect of the invention, each of the frames of at least one of the conveyors is pivotally connected to the conveyor chains on an axis adjacent and parallel to the leading or the trailing edge of the frame and at least one cam follower is connected to the frame and is engaged by a cam means, such as a track, running alongside the conveyor to cause the frame to be pivoted in either direction or a component of force to be applied to the frame in either direction about the axis, as desired. This cam and cam follower arrangement can serve the same functions as described above in connection with the prior art but, unlike the prior art, does not actuate the basic closing and opening movements of the molds and, consequently, can be dispensed with. In a preferred embodiment of the invention in which the two conveyors are arranged as an upper conveyor and a lower conveyor and the molded articles are removed from the mold parts on the lower conveyor, the cam and cam follower arrangement is provided for the upper conveyor in order to swing the frames upwardly upon the recirculating of the mold parts after the molds have been opened in order that conveniently any material which may have stuck in the upper mold parts may be cleaned away. A like arrangement may be provided for the lower conveyor in order to permit the frames carried by the lower conveyor to swing downwardly upon the recirculating of the mold parts in order that conveniently any material which may have stuck in the lower mold parts may likewise be cleaned away. Unlike the prior art, a cam and cam follower arrangement only at one or both sides of the conveyor can serve to effect a pivotal movement of a multiplicity of side by side mold parts.

According to yet another aspect of the invention, there may be provided means for resiliently biasing the frames on one of the conveyors toward the frames on the other conveyor so that at a given point in the path of the conveyors the molds are held together with a predetermined pressure which may be varied from point to point in the path as desired so that the venting of gases and vapors from the molds is regulated.

These features of the invention will be described in more detail along with other features of the invention in connection with a preferred embodiment of the invention as illustrated in the drawings.

BRIEF DESCRIPTION OF THE DRAWINGS

FIG. 1 is an isometric view, with portions partly broken away, of a complete waffle making machine incorporating the present invention;

FIG. 2 is an isometric view of the upper and lower parts of a split mold for forming one of the waffles;

FIG. 3 is an exploded isometric view of a detail of the assembly of one of the parts of the split mold with the frame on which that part is mounted;

FIG. 4 is an isometric view showing a detail of the upper conveyor assembly;

DETAILED DESCRIPTION OF A PREFERRED EMBODIMENT OF THE INVENTION

Figure 5:
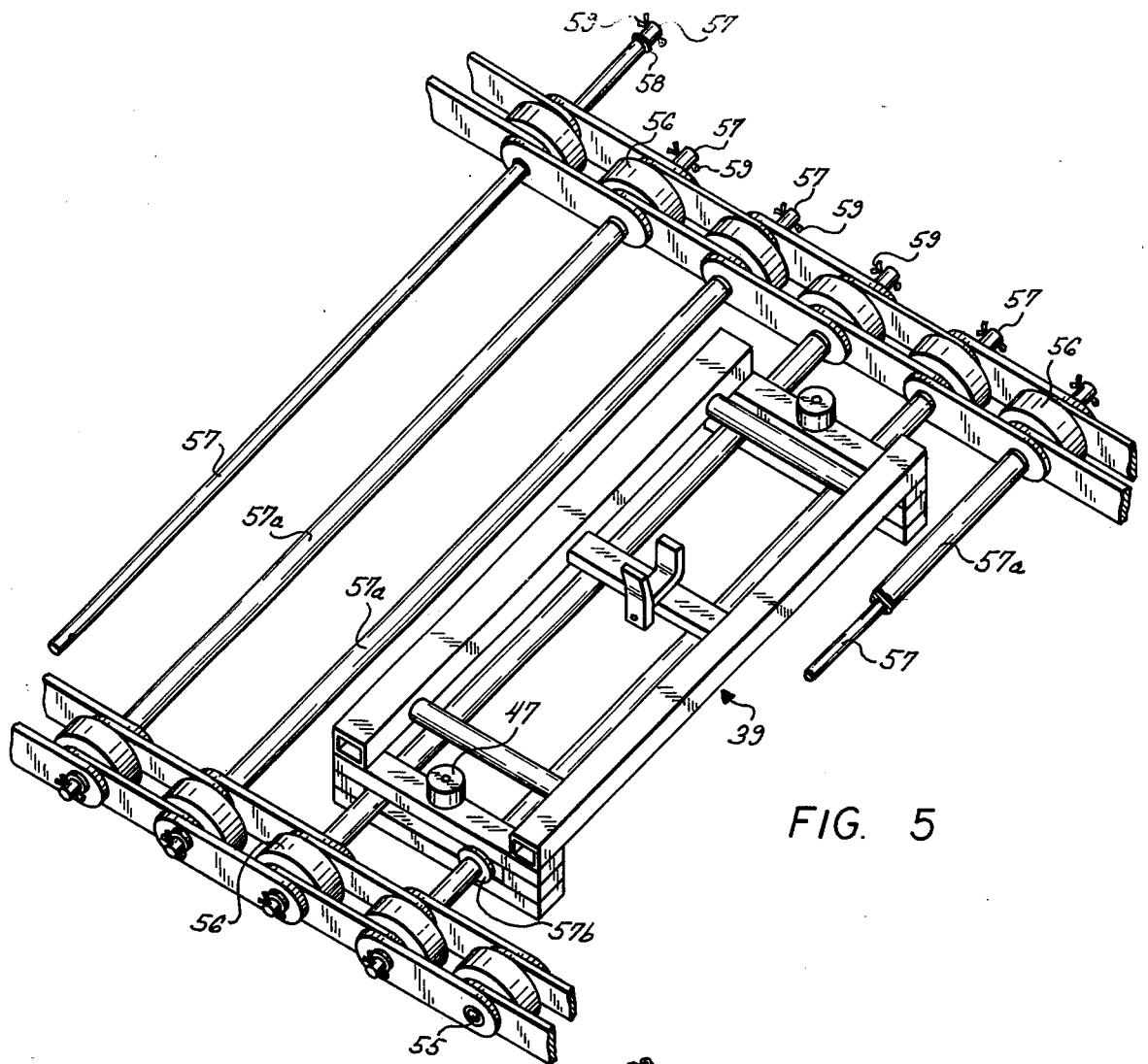
FIG. 5 is an isometric view showing a detail of the lower conveyor assembly.

With reference to FIG. 1, the ingredients for a waffle batter are charged by a conventional means (not illustrated) to a mix tank 10. A pump (not illustrated) delivers the batter ingredients through a conduit 11 to an agitating tank 12 provided with a small mixer 13. The thoroughly mixed batter is delivered from the agitating tank 12 by means of a pump (not illustrated) through a conduit 14 to a hopper 15. From the hopper 15 the batter is delivered by means of pumps 16 through conduits 17 to respective dispensing nozzles 18. All of the foregoing is conventional apparatus for the mass production of waffles.

According to the present invention, the waffles are molded by means of an upper endless conveyor 19 carrying split mold parts 20 (FIG. 2) and an endless lower conveyor 21 carrying split mold parts 22 (FIG. 2). The mold parts are arranged in rows of eight across the respective conveyors.

The nozzles 18 dispense batter into each row of mold parts 22 on the conveyor 21. The conveyor 21 is driven in the direction of the arrow toward the upper conveyor 19 which carries the upper split mold parts 20. The mold parts meet between the two conveyors and the forming of the waffles is thus completed. The mold parts meet within an oven 23. While the molds for the waffles are held closed by the conveyors 19 and 21, the waffles are baked in the oven 23, through which they are transported. The oven 23 is, in itself, conventional. It includes a housing 24, exhaust fan 25 provided with a damper 26, exhaust fan 27 provided with a damper 28, combustion chamber 29 provided with a burner 30 and two diffusers provided with blowers 31 and 32.

The baked waffles arrive at the exit end of the oven. The lower conveyor 21 extends beyond the upper conveyor 19. At this extremity of the conveyor 21, a set of eight four-armed rotary transfer devices 33 transfer the baked waffles from the lower mold parts 22 to a conventional converging conveyor 34. The converging conveyor 34 delivers the waffles 35 to an inspection conveyor 36. Generally, from the inspection conveyor 36 the waffles will be delivered to freezing and packaging means (not illustrated).

In FIG. 2, an upper mold part 20 and a lower mold part 22 are illustrated askew in order that the respective male and female members and lip and recess on the mold parts for guiding the mold parts together be visible. It will be understood that, of course, in actual practice the mold parts approach each other along converging planes. The upper mold part 20 is provided with a lip 20a projecting away from the mold part at a right angle and extending along the periphery of the mold cavity of that mold part. The lower mold part 22 is provided with a recess 22a along the periphery of the mold cavity of that mold part, the recess being shaped and dimensioned for receiving the lip with a clearance small enough to effect and maintain precise alignment of the closed mold. It is also seen that the lower mold part 22 is provided with a pair of tapered male pins 36 and the upper mold part 20 is provided with a pair of female pins 37 each having a tapered bore for receiving the male pins 36. Each of the conveyors 19 and 21 is bounded at each of its edges by a chain 38 (FIG. 4). The chains 38 are tautly trained over the guide and driving sprockets 48, 49, 50 and 51 (FIG. 1). Bridging the pairs of chains 38 are frames 39. Each mold part 20 and 22 is individually mounted to a frame 39 by means of four pin assemblies 41 received in clearance holes 42 through each of the corners of the mold part (FIG. 3).

Each pin assembly 41 consists of a screw 43, a sleeve 44 of lesser diameter than the hole 42 so as to define a clearance fit therewith and a locking clip 45. The screws 43 are received in respective threaded holes 46 in the frame 39. The head of the screw 43 as well as the sleeve 44 defines a clearance fit with the hole 42. Once the sleeves 44 have been mounted onto the frames 39 by means of the screws 43, the mold parts may be mounted on the pins thus defined and then prevented from dropping off the pins by means of the clips 45 each of which is received in the annular space between a respective head of a screw 43 and sleeve 44. When thus mounted, the clips 45 are of larger diameter than the holes 42. The clips 45 are made of spring steel and may readily be fastened and unfastened by means of manual pressure, thus permitting rapid demounting and remounting of the mold parts for such purposes as cleaning and replacement.

Turning again to the pins 36 and 37, it is readily appreciated that due to their tapered configurations they will begin to mate though somewhat off center. Because of the clearance fit between the sleeves 44 of the pin assemblies 41 and the holes 42, the mold parts 20 and 22 will shift laterally to permit the pins 36 and 37 to center perfectly with respect to each other and complete their mating. The lateral pressure causing the shifting is imparted by eccentric meeting of the tapered surfaces of the pins 36 and 37. Of course, if the pins 36 and 37 should happen to meet concentrically, no lateral shifting takes place, no lateral shifting being necessary.

The frames 39 are provided with like pins, a female one of which 47 is illustrated in FIG. 5. Whereas it is preferred that the female pins 37 be mounted on the upper mold parts 20 in order that the recesses therein not fill with batter and get clogged when the batter bakes, the pins on the frames 39 are sufficiently remote from the batter so that the female pins 47 may be mounted on the frames 39 of the lower conveyor 21 without significant risk that batter will accumulate in the recesses of the pins 47. The pins on the frames are made sufficiently longer than the pins on the mold parts so the pins on the frames mate before the pins on the mold parts mate. Hence, before the mold parts are aligned, the frames are aligned.

Each of the frames 39 which is associated with the upper conveyor 19 is pivotally mounted near its trailing edge to the pair of chains 38 of the conveyor. With reference to FIG. 4, it is seen that each of the chains 38 is constituted of link assemblies 52 of conventional construction. Opposed elongated link members 53, 54 are pivotally connected to the next like link members by means of a hollow pivot pin 55 passing through the link members and a cylindrical member 56 which spaces the opposed elongated link members in parallel relationship. Traversing the conveyor 19 at right angles to the chains 38 are cross rods 57. Received over the cross rods 57 with a clearance fit are cross tubes 57a which extend substantially up to the pivot pins 55 and are of larger external diameter than the internal diameters of the pivot pins 55. To each lateral edge of each frame 39 near the trailing edge thereof is rigidly connected a respective retainer 57b, and the cross tube 57a is received with a clearance fit in the pair of retainers 57b thus provided. A washer 58 together with a cotter pin 59 at each end of the cross rod 57 securely but removably retains the cross rod 57 on the chains 38. The clearance between the cross rod 57 and the cross tube 57a and between the cross tube 57a and the retainers 57b provided sufficient play in the connection between each frame 39 and the chains 38 to permit the male and female members on the frames to align the frames. After the frames have thus been aligned, the lip 20a around the upper mold cavity mates with the recess 22a around the lower mold cavity, as the closing of the mold is completed, to effect and maintain a final, even more precise alignment of the mold parts 20 and 22.

At each end of the leading edge of each frame 39 associated with the upper conveyor 19 is provided an upwardly extending arm 60 rigidly connected to the frame 39 and carrying near its distal end a roller 61. The roller 61 runs along a track 62 above the chain 38. When the track 62 is parallel to the chain 38 as the molds pass through the oven 23, the molds are closed. If desired, there may be provided in the track 62 periodic bumps 62a which lift the leading edge of the upper mold part out of sealing contact with the lower mold part whereby the mold is momentarily vented. At the reversal points of the conveyor, a smooth transition may be made from the track 62 to an upper track 63 by providing an overlap between the track 62 and the track 63 so that the roller 61 is guided between the tracks 62 and 63 before transferring to the track 63. On the upper track 63, when the upper mold parts are parallel to the plane of the upper conveyor, the arm 60 is vertical to that plane and extends upwardly from the roller 61. If it is desired to shift the upper mold parts from an orientation parallel to the plane of the conveyor in its return path to a plane normal or oblique to the plane of the conveyor, for such purpose as to facilitate cleaning of the mold cavity of the upper mold part, the track 63 may be provided with a depression 63a. As illustrated in FIG. 4, the depression 63a is sufficiently deep so that the upper mold parts would be suspended in a plane perpendicular to the plane of the upper conveyor in its return path. Obviously, an alternative would be to omit a section of the upper track 63 entirely. For purposes of illustration, a break in the lower track is shown at 64. Note how the frame, the arm of which is no longer supported by the track, has pivoted into a vertical orientation. Such pivoting would likewise occur at an interruption in the upper track.

Also, wherever desired along the path of travel of the upper conveyor through the stage at which the molds are closed, there may be provided a track 65 mounted on the frame of the machine and a track 66 suspended from the track 65 by means of helical springs 67 (FIG. 4). Such an arrangement is provided near each lateral edge of the conveyor. At least one of the transverse members 68 of each of the frames 39 extends sufficiently at each of its ends so that it is engaged by and makes sliding contact with the track 66 of a respective one of the aforementioned arrangements. The spacing of the elements is predetermined so that this engagement places the springs 67 under compression whereby the internal pressure in the molds required to lift open the molds is increased by virtue of the additional force applied to the upper mold parts 20 through the frames 39. Of course, the construction of such arrangements is subject to wide variation well within the skill of the art. For example, pistons in hydraulic or pneumatic cylinders may be employed to apply the force to the frames 39.

To transfer the waffles from the open molds to the converging conveyor 34, there are provided a plurality of rotary transfer devices 33 equal in number to the number of columns of molds. Hence, if the molds are arranged in rows of eight, there are eight of the rotary transfer devices.

It is apparent from FIG. 5 that the elements of the lower conveyor are essentially the same as the elements of the upper conveyor. Consequently, the same reference numbers have been used. The explanation given above regarding the upper conveyor is in large measure applicable to the lower conveyor and will not be repeated. It is noted that for the sake of showing in greater detail how the cross rods 57 and cross tubes 57a are assembled together and with the conveyor chains, the portion of the lower conveyor illustrated in FIG. 5 is shown in an only partly assembled condition. Only one frame 39 mounted on the conveyor is shown. One of the cross rods 57 is shown with the washer and cotter pin removed from one end thereof and the cross rod being partly withdrawn from its position in the conveyor, that cross rod and being illustrated without a cross tube mounted thereon. One of the cross rods with a cross tube mounted thereon is illustrated with the cross tube and cross rod broken off at different points, only for the sake of showing that the cross rod is received in the cross tube. As can be seen from FIG. 5, for a frame 39 on the lower conveyor, only one of the two sets of cross rods 57 and cross tubes 57a is provided with a pair of retainers 57b. As mentioned above, the frames on the lower conveyor may be mounted and provided with cams and cam followers, in the same manner as the frames on the upper conveyor, and, thus, change orientation in the same manner as the upper conveyor frames.

Figure 6:
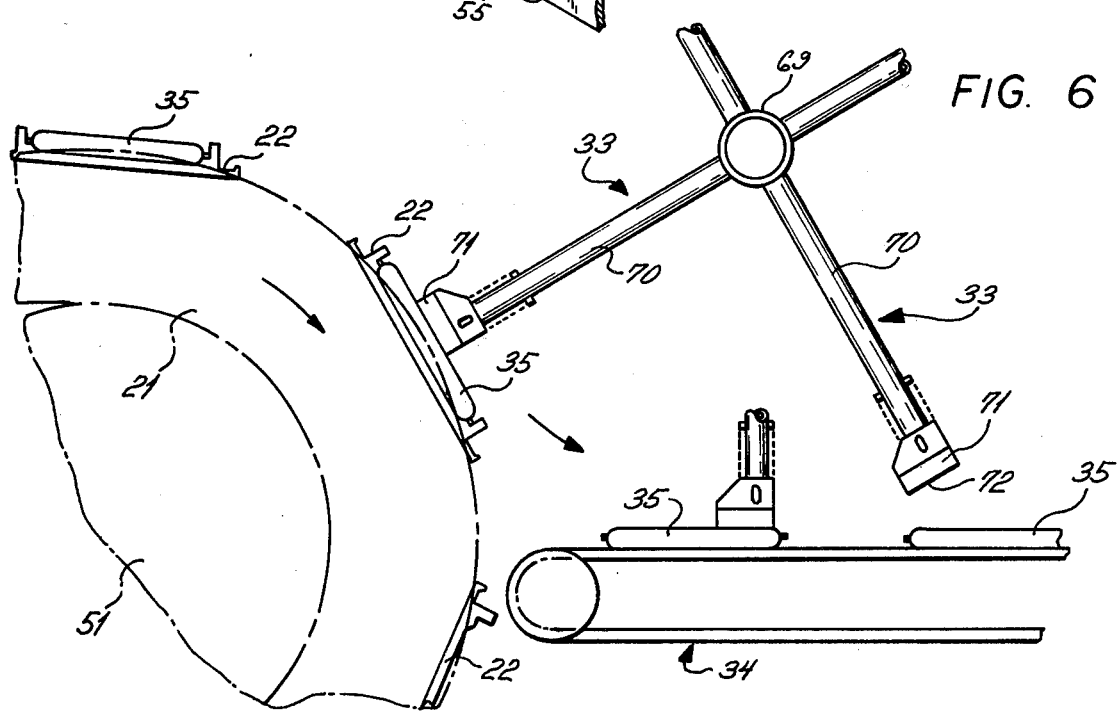
FIG. 6 is a side elevation of the section of the apparatus for transferring the baked waffles from the baking section of the apparatus.

Turning to FIG. 6, it is noted that the rotary transfer devices 33 include a common hollow shaft 69 which is rotationally driven and each include a set of four hollow arms 70 which communicate with the hollow shaft 69. The arms 70 extend radially from the shaft 69 at the same ninety degree spaced positions around the circumference of the shaft 70 for each of the rotary devices.

At the end of each of the arms 70 is provided a hollow shoe 71 communicating with the arm 70. The sole 72 of each of the shoes 71 is at least partly open.

As the sprocket 51 of the conveyor 21 rotates clockwise, the rotary transfer devices 33 rotate counterclockwise. As a mold part 22 containing a waffle 35 comes around the sprocket 51, a shoe 71 of the transfer device 33 moves over and in juxtaposition to the waffle 35. Simultaneously, negative pressure, that is, vacuum is applied to the open sole 72 of the shoe 71 thereby to cause the waffle 35 to adhere to the shoe 71. The shoe 71, now carrying with it a waffle 35 continues its counterclockwise rotation. When it is over the converging conveyor 34, positive pressure is applied to the sole to cause the waffle 35 to be released from the shoe onto the converging conveyor. The means for alternately applying positive and negative gaseous pressure to the shoe is well known. For example, the hollow shaft 69 may be constituted of a stationary hollow inner shaft partitioned in an axial plane with one side of the partition communicating with a source of positive pressure and the other side of the partition communicating with a source of negative pressure, ports about the circumference of the shaft communicating with the respective sides of the partition, and a rotationally driven outer hollow shaft provided with ports communicating with the hollow arms 70, the ports for the arms 70 registering with the ports in the inner shaft communicating with the negative pressure portion of the shaft when the waffles are to be lifted and registering with the ports in the inner shaft communicating with the positive pressure part of the inner shaft when the waffles are to be released.

Details of the machine frame, drive motors and drive train have not been illustrated because these are readily visualized by one skilled in the art. Moreover, the details disclosed hereinabove are illustrative rather than limitative of the invention, the scope of which is defined by the appended claims which are intended to include variants and modifications obvious to one skilled in the art.

What is claimed is:

1. Apparatus for continuous molding comprising first and second endless conveyors, a plurality of two-part split molds, one part of each of said molds being loosely connected to one of the conveyors and the other part of each of said molds being loosely connected to the other conveyor, means for guiding the conveyors so that the mold parts on the respective conveyors converge to close the molds and then diverge to open the molds and means for automatically and progressively correcting misalignment of the mold parts on the respective conveyors as the mold parts converge, the automatic progressive misalignment correcting means including tapered male members fixed to the mold parts on one of the conveyors and female members fixed to the mold parts on the other conveyor, the female members each having a flared recess dimensioned to mate with a respective one of the male members, the male and female members being of such axial dimensions and so oriented that they begin to mate as the mold parts converge, frames, means operatively connecting each of the frames to a respective one of the conveyors to move with the conveyor and permitting each frame to shift relative to the conveyor to which it is connected for alignment with a frame connected to the other conveyor, pins fixed to the frames, apertures passing through the mold parts, the pins being received in the apertures and the apertures being of larger diameter than the pins so that the pins are received in the apertures with a clearance fit which permits lateral displacements of the mold parts, tapered male members fixed to the frames connected to one of the conveyors and female members fixed to the frames connected to the other conveyor, the female members fixed to the frames each having a flared recess dimensioned to mate with the male members fixed to the frames, the male and female members fixed to the frames being of such axial dimensions and so oriented that they begin to mate as the mold parts converge and before the male and female members fixed to the mold parts begin to mate.

2. Apparatus according to claim 1, in which the means for automatically and progressively correcting misalignment of the mold parts on the respective conveyors as the conveyors converge also include an annular lip formed on said one part of each of said molds and an annular recess formed on said other part of each of said molds, the recess being shaped and dimensioned for receiving the lip as the closing of the mold is completed, the clearance between the recess and the lip received therein being sufficiently small to effect and maintain precise alignment of the closed mold.

3. Apparatus according to claim 2, further comprising means for mounting the frames connected to one of the conveyors for pivotal movement about an axis parallel to the plane of the conveyor and substantially perpendicular to the length of the conveyor.

4. Apparatus according to claim 3, further comprising a respective arm fixed to each of the pivotally mounted frames, a track in proximity to the arm and extending at least part way along the conveyor on which the frames are pivotally mounted and means on the arm for engaging the track.

5. Apparatus according to claim 4, in which the track along part of its length departs from an orientation parallel to the plane of the conveyor on which the frames are pivotally mounted, thereby causing the pivotally mounted frames and the mold parts carried thereon to assume orientations not parallel to the plane of the conveyor on which the frames are pivotally mounted.

6. Apparatus according to claim 3, further comprising means for resiliently biasing the frames on one of the conveyors toward the frames on the other conveyor.

7. Apparatus according to claim 2, in which the mold parts are arranged in lateral rows across the conveyors, each of the rows comprising more than two of the mold parts.

8. Apparatus according to claim 2, further comprising means for removing molded articles from one of the mold parts after the conveyors have diverged to open the molds.

9. Apparatus according to claim 8, in which the removing means comprise hollow shoes having at least partly open soles, means for alternately applying positive and negative gaseous pressure through said open soles and means for moving said shoes over and in juxtaposition to said molded articles in said open mold parts containing the articles, whereupon negative pressure is applied to said open soles to cause said articles to adhere to said shoes, and for moving said shoes with said articles adhering thereto away from said open mold parts, whereupon positive pressure is applied to said open soles to cause said articles to be released from said shoes.

* * * * *